(12) United States Patent
Fiorentino

(10) Patent No.: US 9,344,135 B2
(45) Date of Patent: May 17, 2016

(54) HOLDING AID TO TYPE ON A TOUCH SENSITIVE SCREEN FOR A MOBILE PHONE, PERSONAL, HAND-HELD, TABLET-SHAPED, WEARABLE DEVICES AND METHODS OF USE

(71) Applicant: Jairo Fiorentino, Grapevine, TX (US)

(72) Inventor: Jairo Fiorentino, Grapevine, TX (US)

(73) Assignee: Jairo Fiorentino, Grapevine, TX (US)

( * ) Notice: Subject to any disclaimer, the term of this patent is extended or adjusted under 35 U.S.C. 154(b) by 105 days.

(21) Appl. No.: 14/311,326

(22) Filed: Jun. 22, 2014

(65) Prior Publication Data

US 2015/0372705 A1  Dec. 24, 2015

Related U.S. Application Data

(60) Provisional application No. 61/843,904, filed on Jul. 8, 2013.

(51) Int. Cl.
  *H04M 1/00* (2006.01)
  *H04B 1/3827* (2015.01)
  *H04M 1/02* (2006.01)

(52) U.S. Cl.
  CPC .............. *H04B 1/385* (2013.01); *H04M 1/0279* (2013.01); *H04B 2001/3861* (2013.01)

(58) Field of Classification Search
  CPC .............. H04M 1/04; H04M 1/72522; H04M 2250/22; G06F 3/04886; G06F 1/1601; G06F 1/626; G06F 2200/1612; H05K 5/0204; H05K 5/03
  USPC ......... 455/575.6, 575.8, 128, 550.1; 379/447, 379/450, 454, 455; 206/45.2
  See application file for complete search history.

(56) References Cited

U.S. PATENT DOCUMENTS

| | | | |
|---|---|---|---|
| 2013/0154959 A1* | 6/2013 | Lindsay ................ | G06F 1/1694 345/173 |
| 2014/0062875 A1* | 3/2014 | Rafey .................... | G06F 17/276 345/158 |
| 2014/0221055 A1* | 8/2014 | Wu ...................... | H04M 1/0281 455/575.6 |
| 2015/0245519 A1* | 8/2015 | Forristall ................ | H05K 5/03 320/103 |

* cited by examiner

*Primary Examiner* — Shaima Q Aminzay

(57) ABSTRACT

The object of this invention is a holding aid or apparatus H (FIG. 1) intended to help a user to hold a mobile device with its finger tips while at the same time typing on the device touch screen keyboard. The apparatus can be attached or integrated (FIG. 4) to the back of device cover or body. The holding aid is composed of a platform or base member, an articulated joint mechanism and at least two lateral flat tab members (FIG. 2) with orifices that are connected to the sides of the base member by means of the articulation joint. The lateral flat tab members and orifices are ergonomically designed and prepared to receive user finger tips according to the position of the user hands while typing on the touch sensitive screen keyboard. The ergonomic design (FIG. 13) of the holding apparatus allows the user to hold the mobile device with finger tips and let other fingers free to operate the mobile device functions. The apparatus lateral flat tab members are connected to an articulated joint mechanism and may rotate and close (FIG. 9) towards the back to the mobile device, allowing for easy mobile device transportation in user clothing pockets or in a pouch wallet device case. The holding aid apparatus may be implemented as separate structure attachable to the device body or case or a specially fitted device case incorporating the holding aid structure.

7 Claims, 13 Drawing Sheets

HOLDING AID TO TYPE ON A TOUCH SENSITIVE SCREEN FOR A MOBILE PHONE, PERSONAL, HAND-HELD, TABLET-SHAPED, WEARABLE DEVICES AND METHODS OF USE

REFERENCE TO PROVISIONAL PATENT APPLICATION 61/843,904

This patent application is entitle to and claims the benefit of the priority of U.S. provisional application 61/843,904, filed on Jul. 8, 2013, the entire contents of which are incorporated here by reference.

FIELD OF THE DISCLOSURE

The present disclosure generally relates to a holding aid apparatus to be attached to a mobile device outer body shell, case, or cover by appropriate means as a holding aid for a user while holding the mobile device and operating or typing on the electronic device touch sensitive screen. This holding aid apparatus is applicable to a variety of mobile smart phones, portable devices, reading devices, personal assistants, wearable portable devices, or any other similar mobile devices using a touch sensitive screen.

BACKGROUND

Mobile electronic devices such as mobile smart phones, electronic reading devices, e-book readers, and other portable electronics are usually equipped with a general purpose touch sensitive screen. Touch sensitive screens became a very popular application for portable mobile products and are used for various purposes due to the versatility of the on screen keyboard.

Before the generalized use of touch screens, most of the smart mobile devices implemented a physical keyboard that allowed the user to hold the device by touching on both, front and back device surfaces, with enough pressure to hold the device. The user was able to hold these devices by resting the thumbs on top of the keyboard while the index and middle fingers were generally positioned on the back of the mobile device. This type of device equipped with physical keyboard allows the user to excerpt enough amount of pressure on the portable device using the thumbs on the front surface and the index and middle fingers on the back surface to hold the mobile device but not yet enough pressure to activate any key on the physical keyboard.

However, new models of portable devices are equipped with a touch sensitive screen that generally covers the whole front surface of mobile device. Since the new devices are equipped with this full size touch sensitive screen it is not an option anymore to rest the user thumbs over the touch screen surface because any pressure of the fingers will activate keys on the onscreen keyboard.

Therefore the new touch sensitive screen technology also brought to mobile device users increasingly difficulties to hold the device while typing on it, because it is not possible anymore to hold the device in the same way users used to hold portable devices equipped with a physical keyboard.

For illustration the anatomic details of the typical position of the hand and fingers of a user while holding and typing on a mobile electronic device are shown in FIG. 10. As can be seen in this figure the users' thumbs are used for typing on the screen keyboard (see also FIG. 11). The touch sensitive keyboard usually takes half of the screen while the other part of the screen shows the text that the user is entering.

Therefore a need exists for a holding aid apparatus to hold the portable device that is specifically designed considering the anatomical and ergonomic aspects of the user hands and fingers while the user is typing on the touch sensitive screen surface of the portable device.

There are a variety of proposed holding devices to help the user to hold a small electronic device; however none of the holding devices were appropriately projected for holding and typing considering the anatomical and ergonomic aspects of holding the portable device and typing. The device described in this disclosure is intended to bridge this gap and is generally intended as a holding aid or apparatus specifically designed to hold the portable device while the user is using it and typing on the touch sensitive screen surface.

SUMMARY

The object of this invention generally relates to a holding aid apparatus for a portable electronic device while the user is typing on the touch sensitive screen of the mobile device. The holding device is a structure (FIG. 1) that can be incorporated or attached to a variety of portable hand held devices that implements or makes use of touch sensitive screen keyboard. The holding aid apparatus structure is composed of a base or platform member, at least two articulated joints and at least two lateral tab shaped members. The lateral tab shaped members are generally flat, equipped with orifices and attached to the base flat member by means of articulated joints. The base member may be integrated or embedded (FIG. 4) into the back of a mobile device case or cover. The finger holding member of the device may be constituted at least of two lateral tabs (right and left), one tab or flat member containing generally two orifices and designed to house a pair of fingers of the user right hand and the other tab also generally containing two orifices for insertion of at least two of the user left hand fingers. The lateral flat tab members are connected to the moving part of the articulation and may rotate around the axis defined by the articulated joint. The articulated joint allows the tab members a rotation movement to open or close the holding aid tabs in relation to base member. The articulation can be implemented by a hinge mechanism or a flexible material articulation at the joint of the lateral tab flat member with the base member. The flat tab lateral members while in closed position (FIG. 9) allow for the mobile device transportation in user pockets or pouches. The holding aid apparatus may be integrated or embedded on a mobile device cover in such way that the base member is seamlessly incorporated into the back surface (FIG. 4) of the hand held cover or outer shell. The holding aid apparatus structure is designed to help a user to hold the device in the appropriate and ergonomic position for typing without necessarily touching the sensitive screen. The holding aid apparatus allows the user to hold the mobile device with only two fingers of each hand (for example, Index finger and Middle finger) and let both thumbs free (floating and able to hover above the touch sensitive screen) and therefore the user fingers are free to activate only desired keys on the touch screen keyboard. The apparatus lateral flat tabs may also rotate and close (FIG. 9) allowing for easy transportation in user clothing pockets or in pouch wallet case cover.

DETAILED DESCRIPTION

The present invention is described in detail in this section with reference to the accompanying drawings. This invention may or may not be constructed or limited by any means to the embodiments set forth herein; rather, these embodiments are provided so that this disclosure is thorough and complete, and to explain the scope of the invention to those skilled in the art. With the reference to the figure annotations, like numbers refers to like structural elements throughout each one of the drawings as presented. The following drawings describe various embodiment examples of the holding aid configuration. Relative terms such as 'interior" and "exterior" are used herein to describe the positional relationship of one component of the holding aid apparatus in relation to the base member of the aid apparatus as illustrated in the figures. "Interior" generally refers to the region close the back surface of the base member, and "exterior" generally refers to the outer space surrounding the mobile device.

Figure 1:
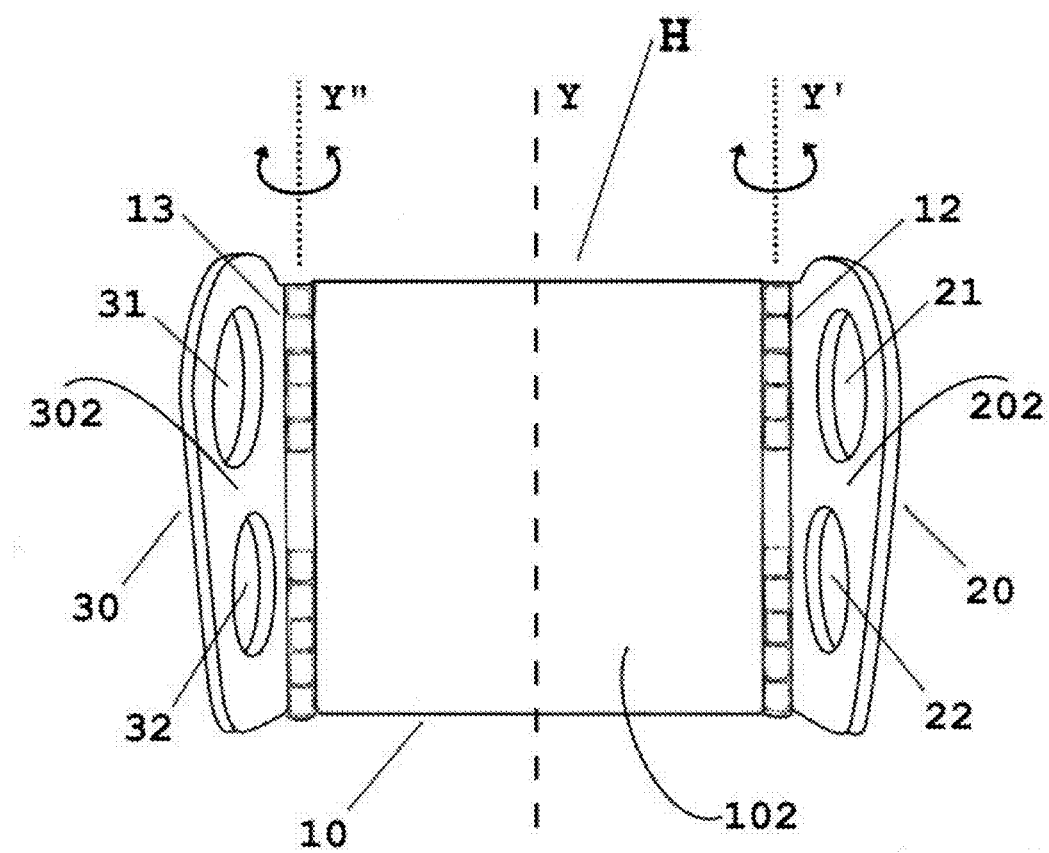
FIG. 1 shows a complete rear view of an example of the holding apparatus in active position where each of the two lateral flat tab members are connected to base member by means of a hinge mechanism. The figure also depicts the two axis around which the lateral tab member are allowed to rotate.

FIG. 1 illustrates a perspective view of an example holding aid H for a portable device in accordance with the present disclosure. The holding aid H is integrated to the external shell or cover of the mobile electronic device according to several different ways.

In the embodiment illustrated in FIG. 1, the holding device has generally a first holding member 20, and a second holding member 30, which are preferably and approximately equal in area, size and format, a base or platform member 10, and two articulated joints 12 and 13. Each one of the finger holding members 20 and 30 which are also referred as lateral flat tab members preferably implements one or two circular or oval orifices each one. These orifices are used to hold the user finger tips. The finger holding members or lateral flat tab members are also referred as "wings" in the provisional application 61/843,904, filed on Jul. 8, 2013.

The base or platform member 10 functions as a base or platform to which the lateral flat tab members 20 and 30 are appropriately connected by an articulated joint mechanism. It may be also appreciated that the first holding member 20, and the second holding member 30 may also be implemented with orifices of different numbers, forms and sizes, and the members and orifices may be specifically sized to fit a particular electronic mobile device size, or may be sized generally to fit a variety of devices as best as possible. Additionally the holding member orifices may be implemented with adjustable orifice sizes and formats.

As it will be appreciated, each one of the holding aid apparatus components, as well the joint articulation mechanism, may be constructed of a metal material, a resin or plastic material, a composite material of metal and plastic, a composite material of polymer resin and fiber woven (fiber glass, carbon fiber, etc.) and or any other material as desired and satisfying the required mechanical properties to serve as a holding structure for the user finger tips according to mobile device weight and size. The three members 10, 20 and 30 may be formed from a single piece of material integrated with each other via a flexible material joint or may be formed by three different pieces of material integrated with a hinge articulation mechanism.

In the example illustrated in FIG. 1 the first holding member 20 is joined to the base member 10 by means of the articulation 12 implemented by a hinge mechanism, and the second member 30 is joined to the base member 10 by means of the articulation 13 also implemented by a hinge mechanism. The stationary part of the articulate hinge is connected to each of the sides of the base member 10 and the rotatable part of the hinge is connected to the lateral flat tab members 20 and 30. The holding members 20 and 30 may also be called fingertip holding members as they are intended to provide a secure grip for the user finger tips.

In FIG. 1 the broken line Y defines a plane that is perpendicular to the internal or back surface 102 of the base member 10 of the holding device. When the holding apparatus is attached to a mobile device, the back surface 102 of the base member 10 is aligned parallel to the back surface of the mobile device. The device construction is preferably symmetrical in relation to plane Y as the right human hand is generally symmetrical to the left human hand. In this embodiment of the holding aid the tab member 20 is also generally symmetrical to tab member 30 in relation to the plane Y.

The hinge mechanism implemented by articulation 12 allows the flat tab member 20 to pivot around the axis Y' which is defined by the direction of the articulation 12. The member 20 can rotate inwardly to the direction towards of the surface 102 of the member 10, but also can rotate outwardly to the outward direction from the surface 102. The flat member 20 outwardly rotation may be limited at a certain appropriate maximum angle by a hinge locking or friction mechanism. When the rotation towards the interior of the device completes, the surface 202 of the member 20 becomes parallel and touches the surface 102 of the member 10.

In the same way the hinge mechanism defined by articulation 13 allows the flat tab member 30 to pivot around the axis Y'' that is defined by the direction of the articulation 13. The member 30 can rotate inwardly towards the direction of the surface 102 of the member 10, but also can rotate outwardly to the outward direction from the surface 102. The flat member 30 outwardly rotation may be limited at a certain appropriate maximum angle by a hinge locking or friction mechanism. When the rotation towards the interior of the device completes the surface 302 of the member 30 becomes parallel and touches the surface 102 of the member 10.

When both members 20 and 30 complete the inwardly rotation towards the surface 102 and are parallel to the surface 102, the device is said to be in a passive or closed configuration.

Figure 2:
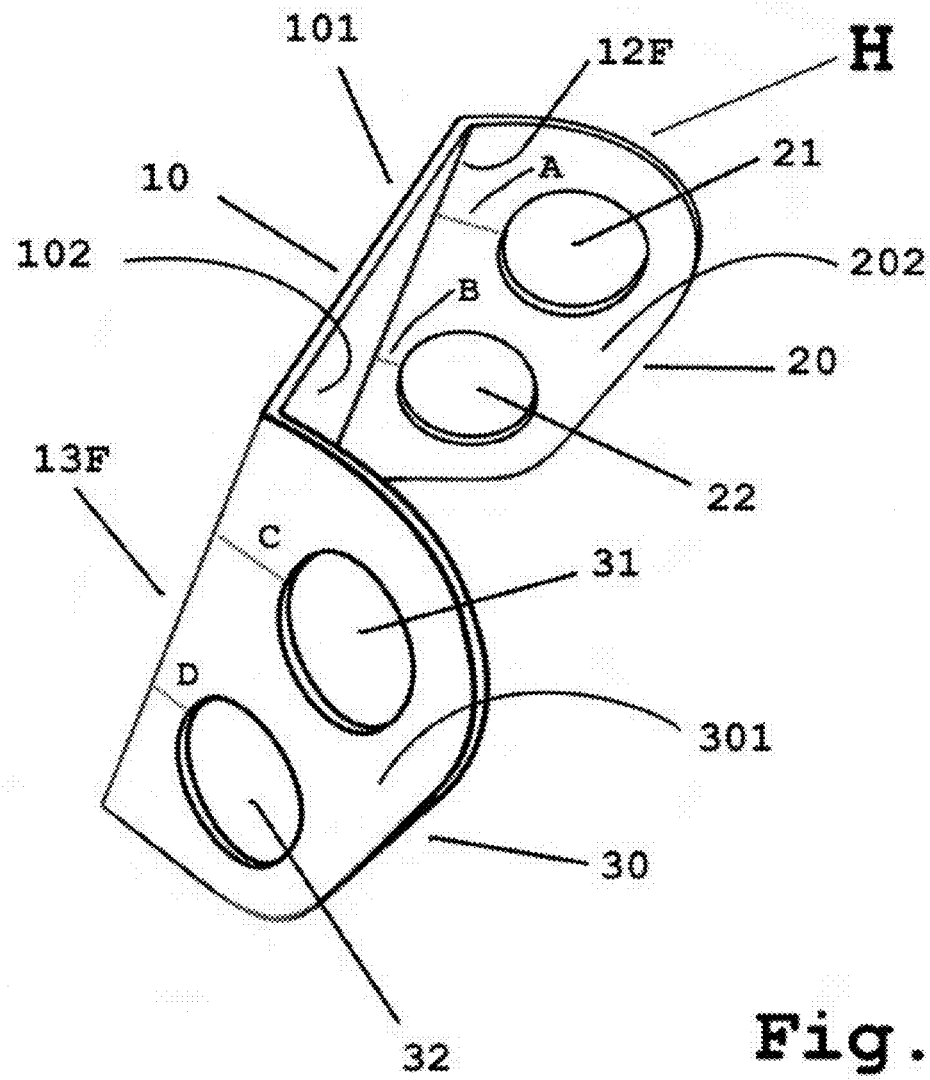
FIG. 2 shows a side view of an example holding apparatus in active position where the lateral flat tab members are connected to the base member platform by means of flexible material articulation. In the same way the lateral tab members are allowed to rotate around the axis defined by the junction of the lateral flat tab member with the base or platform member.

FIG. 2 shows a side view of another example of the holding device. In this embodiment the holding device H is also constituted of the flat base member 10 that has two surfaces, the back surface 101 and the interior surface 102. Preferably, the back surface 101 is constructed in such way to match or have a complementary form in relation to the back surface of mobile electronic device case, shell or cover.

In FIG. 2 embodiment the articulation 12F, joining the base member 10 with the flat tab member 20, is implemented by flexible material articulation mechanism that allows the flat member 20 to swivel around the axis defined by the articulation 12F. The flexible articulation 12F should allow the flat member 20 to rotate inwardly towards the surface 102 or outwardly from the surface 102. The angle of the surface 102 with the surface 202 should be zero or close to zero when the device is closed or in passive configuration or should be around 45° to 90° or even from 90° to about 140° or more when the device is open, in active configuration and ready for use. The angle defined by the articulated joint between the surface 102 and surface 202 may be adjustable to several values to adjust to user hand and fingers position and for better user comfort.

In a similar way, in FIG. 2, the flexible articulation 13F joining the base member 10 with the flat tab member 30 is implemented by flexible material articulation that allows the flat member 30 to swivel around the axis defined by the articulation 13F. The flexible articulation 13F should allow the flat member 30 to rotate inwardly towards the surface 102 and outwardly from the surface 102. The angle of the surface 102 with the surface 302 should be zero or close to zero when the device is closed and in passive configuration or should be around 45° to 90°, or even more than 90° to about 140° or more when the device is open, in active configuration and ready for use. The angle defined by the joint between the surface 102 and surface 302 may be even adjustable to several values for better user comfort.

In FIG. 2 the base member 10 is preferably flat and constituted of two surfaces, the back surface 101 and interior surface 102. The surface 101 of the holding aid platform member 10 is intended to touch and/or adhere to the back surface of the mobile electronic device by means for several attachment mechanisms. It can be attached to the back surface of the mobile device case or cover with adhesive, glue, Velcro, double-sided tape, screws and bolts, pins, ridge and groove combinations or any other appropriate attachment mechanism.

The finger holding member 20 is composed of two surfaces, the exterior surface 201 and the interior surface 202. The surface 201 of the holding device points to the exterior of the holding aid and the surface 202 points to the interior of the holding aid. The member 20 is also preferably a flat member and the profile of the internal surface 202 is preferably complementary to the profile of the surface 102 of the member 10.

In a similar way the finger holding member 30 is composed of two surfaces, the exterior surface 301 and the interior surface 302. The surface 301 of the holding aid points to the exterior of the holding aid and the surface 302 points to the interior of the holding aid. The member 30 is also preferably a flat member with the profile of the internal surface 302 preferably complementary to the profile of the surface 102 of the member 10.

On FIG. 2 embodiment of the holding aid, the member 20 is a generally flat shaped tab that contains the orifices 21 and 22. Generally, the distance A of the border of the orifice 21 to the line defined by articulation 12F can be the same or larger than the distance B of the border of the orifice 22 to the line defined by the articulation 12F. Otherwise and also for ergonomic reasons the distance B may measure approximately from 0 to 5 mm and the distance A may be approximately the same as distance B or up to 50% or up to 100% larger that the distance B. Alternatively, the distances A and B may be adjusted in size to fit in the lateral tabs according to the size of the lateral flat tab member size. The lateral flat tab members are constructed to fit the width of the portable device and limited in size according to the full width of the body of the mobile device.

On FIG. 2, and for better user comfort the border of the orifice 22 may be also as close as possible to the line defined by the articulation 12F, which means that for certain embodiments the distance B should be as small as possible and therefore the distance B can be 0 mm, or up to 5 mm to 10 mm or 15 mm. The same anatomic and ergonomic reasoning may be applied to the distance A which is generally tends to be equal or larger than distance B.

On FIG. 2, the member 30 is also a flat shaped tab that contains the orifices 31 and 32. The distance C of the border of the orifice 31 to the line defined by articulation 13F can be the same or larger than the distance D of the border of the orifice 32 to the line defined by the articulation 13F. Otherwise and also for ergonomic reasons the distance D may approximately from 0 to 5 mm and the distance C may be approximately the same as distance D or up to 50% or up to 100% larger that the distance D. Alternatively, the distances C and D may be adjusted in size to fit in the lateral tabs according to the size of the lateral flat tab member size. The lateral flat tab members are constructed and limited in size according to the width of the body of the mobile device.

The border of the orifice 32 may also be as close as possible to the line defined by the articulation 13F, which means that distance D could be as small as possible and therefore the distance D can be 0 mm, or up to 5 mm to 10 mm or 15 mm. The same anatomic and ergonomic reasoning may be applied to the distance C which generally tends to be equal or larger than distance D.

The shape of the orifices 21 and 31 can be preferably circular, elongated, elliptical, or even similar to a square of round corners. The diameter of the orifice 21 of member 20 and the orifice 31 of the member 30 may be around the diameter of the index finger or middle fingers of an average male or female or generally around 15 mm to 20 mm or even 25 mm, or other size appropriate to fit user finger size. The size of the orifices 21 and 31 can also be made adjustable in diameter by use of complementary adjustment tools, like a ring that can be fitted and inserted inside of the orifice opening. When the ring is inserted into the orifice opening it decreases the diameter of the orifice and when the ring is removed, the orifice returns to its original size. The rings to adjust the orifice opening sizes can be made or several different materials as plastic resin, rubber or composite material. Another reason for the utilization of rings is to improve user comfort if the ring material is softer than the holding member construction material.

In a similar way the shape of the orifices 22 and 32 can be preferably circular, elongated, elliptical or even similar to a square of round corners. The diameter of the orifice 22 of member 20 and the orifice 32 of the member 30 may be around the diameter of the index finger or ring fingers of an average male or female or around 15 mm to 20 mm or even 25 mm, or other size appropriate to fit user finger tip The size of the orifices 22 and 32 can be made adjustable in diameter by use of complementary adjustment tools, like a ring that can be fitted and inserted inside of the orifice opening. When the ring is inserted into the orifice opening it decreases the diameter of the orifice and when the ring is removed, the orifice returns to its original size. The rings to adjust the orifice opening sizes can be made or several different materials as plastic resin, rubber or composite.

Figure 3:
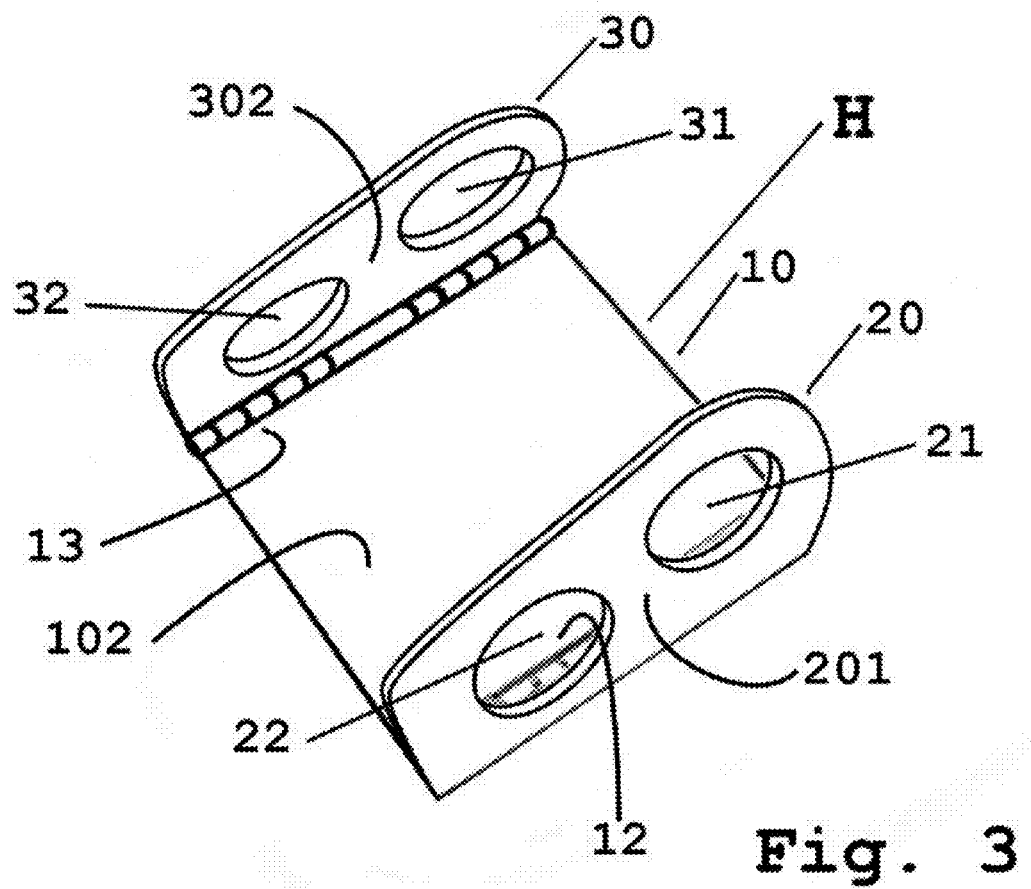
FIG. 3 shows a side and rear view of an example of the holding apparatus where the lateral tab members are connected to the base member by means of an articulation mechanism. The figure also depicts the hinge mechanism for attachment of the lateral tab member to the base or platform member.

FIG. 3 shows a side-rear view of another example of the holding device H, similar in construction with the holding aid presented on FIG. 1. This embodiment shows the two flat members 20 and 30 connected to the base member 10 by means of hinge mechanisms. FIG. 3 also displays a lateral view of the flat tab finger holding member 20 which is composed of two surfaces, 201 and 202 and the outer surface 201 is now shown in the FIG. 3. The holding device structure is shown in open configuration and the flat tab member 20 and 30 may rotate around the hinge joint mechanisms defined by 12 and 13.

Figure 4:
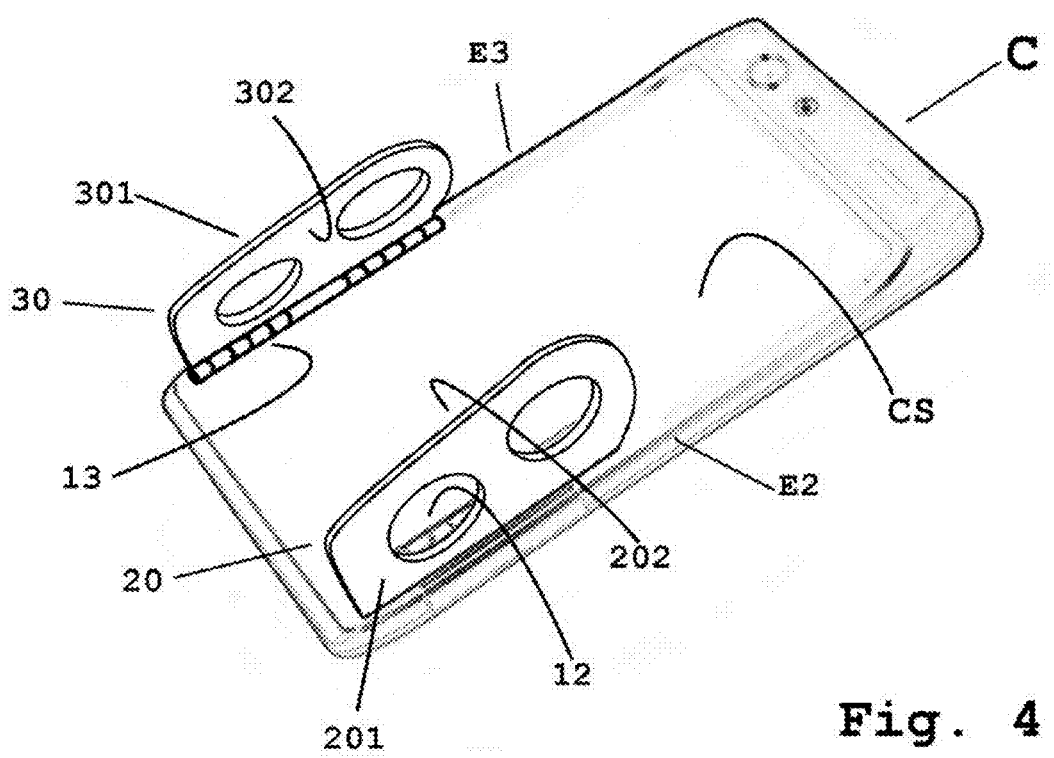
FIG. 4 shows a perspective view of an example of the holding device integrated to an electronic mobile device case. In this embodiment the lateral tab members are attached directly to the device back body by means of a hinge mechanism.

FIG. 4 shows another embodiment of the holding apparatus H where the base or platform member 10 is fully incorporated on a device cover. The FIG. 4 shows the integration of the base member 10 into the mobile device cover, and the flat tab members 20 and 30 connected to the back surface of the mobile device cover by means of an articulation mechanism. The attachment of the tab member 20 with the back surface of the device case is implemented by a hinge mechanism defined by the joint 12. In the same way the flat tab member 30 is attached to the back surface CS of the mobile device case C by means of a hinge mechanism defined by the joint 13.

The stationary parts of the hinge mechanism 12 and 13 are directly attached to the back surface CS of the mobile device case or cover and the rotatable parts of the hinge mechanism, the barrel or pivot, are connected to each one of the rotatable lateral flat tab members 20 and 30. In the embodiment described by FIG. 4, the hinge mechanism 12 allows the flat member 20 to swivel or rotate around the axis defined by the articulation 12 inwardly, towards the surface CS defined by the back of the device case C, and outwardly of the surface CS. The angle of the surface CS with the surface 202 should be zero when the device is closed and in a passive configuration or should be between 90° to 135° or up to 140° when the device is open, in an active configuration and ready for use. In a similar way the hinge mechanism 13 allows the flat member 30 to swivel or rotate around the axis defined by the articulation 13 and in the same way as the rotation range of the member 20 around articulation 12.

When the device is open and in active configuration the hinges associated with flat tab members 20 and 30 preferably may gradually increase resistance to additional increase of the aperture angle between each one of the flat tab members and back surface CS of the mobile device case. This may happen when the rotation angle opens beyond the range of 90° to 135° or up to 140°. The increased resistance to enlarge the opening angle could be implemented at the hinge mechanism by a friction or locking mechanism that may include the application of stops, grooves, dents, ridges, corrugations, and roughened surfaces or combinations thereof.

At the angle where the tabs present the best ergonomic results for the user finger and hands position, the friction of the hinge mechanism should start to increase. With increased hinge friction or by application of a hinge locking mechanism the tabs become gradually more resistant to rotation and more fixed in position. This increased resistance to rotation will facilitate the user to insert finger tips' in the designated orifices.

In the embodiment described in FIG. 4, the articulation 12 is attached to the back surface CS of the portable device cover at a position close to the edge E2 of the mobile device. The edge E2 is defined by the corner between the mobile device back surface CS with the surface of the side of the mobile device. In this way the articulation 12 is positioned generally parallel and preferably close to or at the edge E2. Generally the distance of the articulation 12 to the edge E2 may be determined based on ergonomic and comfort criteria aiming to improve user experience.

In a similar way the lateral flat member 30 is positioned in such a way that the joint 13 is aligned generally parallel to the edge E3 of the mobile device cover and preferably close to or at the edge E3. Depending on the width of the mobile device, the hinge mechanisms 12 and 13 can be implemented more or less close to the respective edges E2 and E3, or can be implemented with some indentation from the device cover edge for better ergonomic results.

The tab members 20 and 30 should be able to swivel or rotate around the axis defined by hinge mechanisms 12 and 13 inwardly and outwardly of the back surface CS of the device cover. When the internal surfaces 202 and 302 of the holding device are parallel to the surface CS of the back of the device cover the holding apparatus is said to be in closed position, prepared for transport and ready to be stowed in a user pocket.

Figure 5:
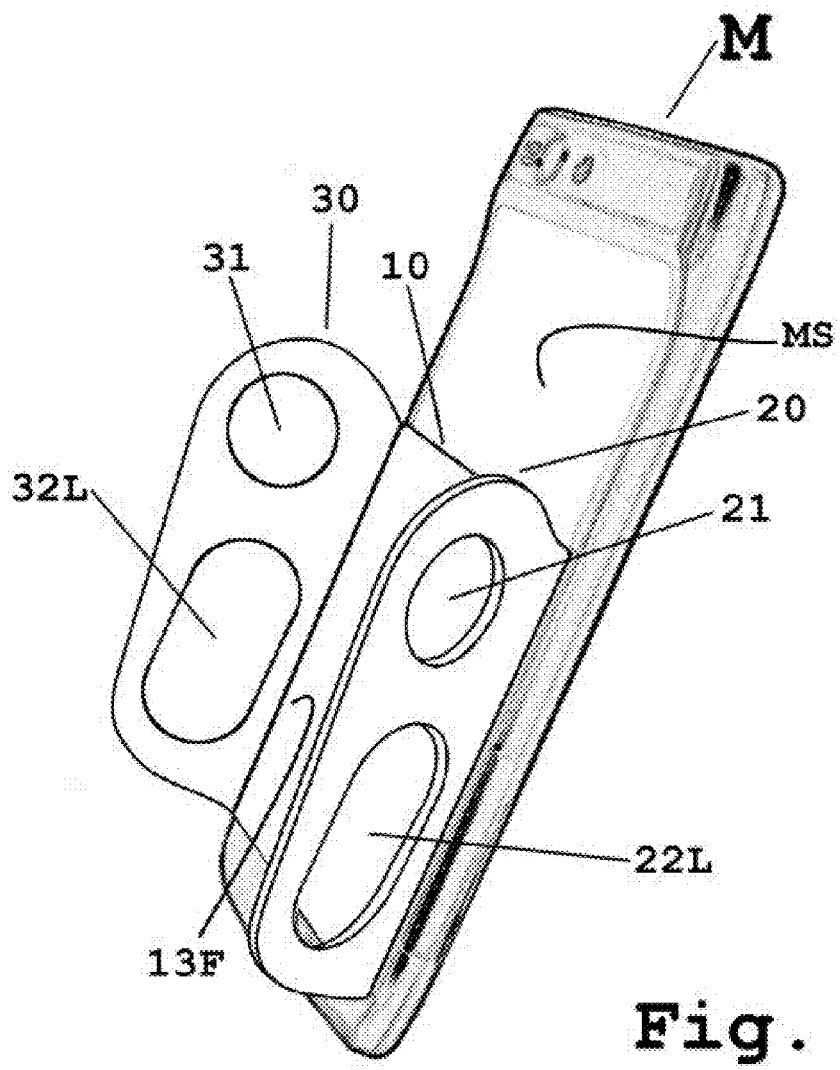
FIG. 5 shows a lateral-rear view of an example of the holding device attached to the back of a mobile device constructed with optional larger and elongated orifices that can accommodate two finger tips each. The lateral tab members are attached to the base member via flexible material articulations.

FIG. 5 is a perspective view showing another embodiment of the holding aid for a mobile electronic device constructed in accordance with the present disclosure. The holding aid is shown in active configuration and attached to the back of the mobile device M. This embodiment of the holding apparatus is implemented with enlarged finger orifices. The orifice 22L on flat tab 20 and the orifice 32L on flat tab 30 are both enlarged and elongated. This configuration is intended to help holding mobile devices that are larger or heavier than regular sized mobile phones. In this example the user can accommodate the right hand index finger tip in orifice 21 and both the middle and ring fingers on orifice 22L or insert the middle finger in orifice 21 and both ring and baby fingers in orifice 22L and similarly for the left hand the user can insert the corresponding fingers on the orifice 31 and use the enlarged orifice 32L to accommodate two other finger at once.

The shape of the orifices 22L and 32L are preferably an elongated ellipsis or even similar to a square of round corners. The length of the larger axis of the ellipsis 22L should be approximately twice the diameter of the orifice 21 of member 20 and similarly the length of the larger axis of the orifice 32L should be approximately twice the diameter of the orifice 31 of the member 30. The dimension of the smaller axis of the ellipsis defined on the orifices 22L and 32L should be about the same as the diameter of the orifices 21 and 31. The size of the larger dimension of orifices 22L and 32L should match approximately the sum of the average diameters of the index and middle fingers of an average male or female, or approximately 30 mm to 40 mm or even up to 45 mm or more. The sizes of the orifices can also be made adjustable by means of adjustment tools like rings of different sizes that can be inserted and fitted in the inner surface of the orifice. The adjustment rings can also be made of soft materials and used to pad the inner orifice surface and therefore improve user comfort.

Figure 6:
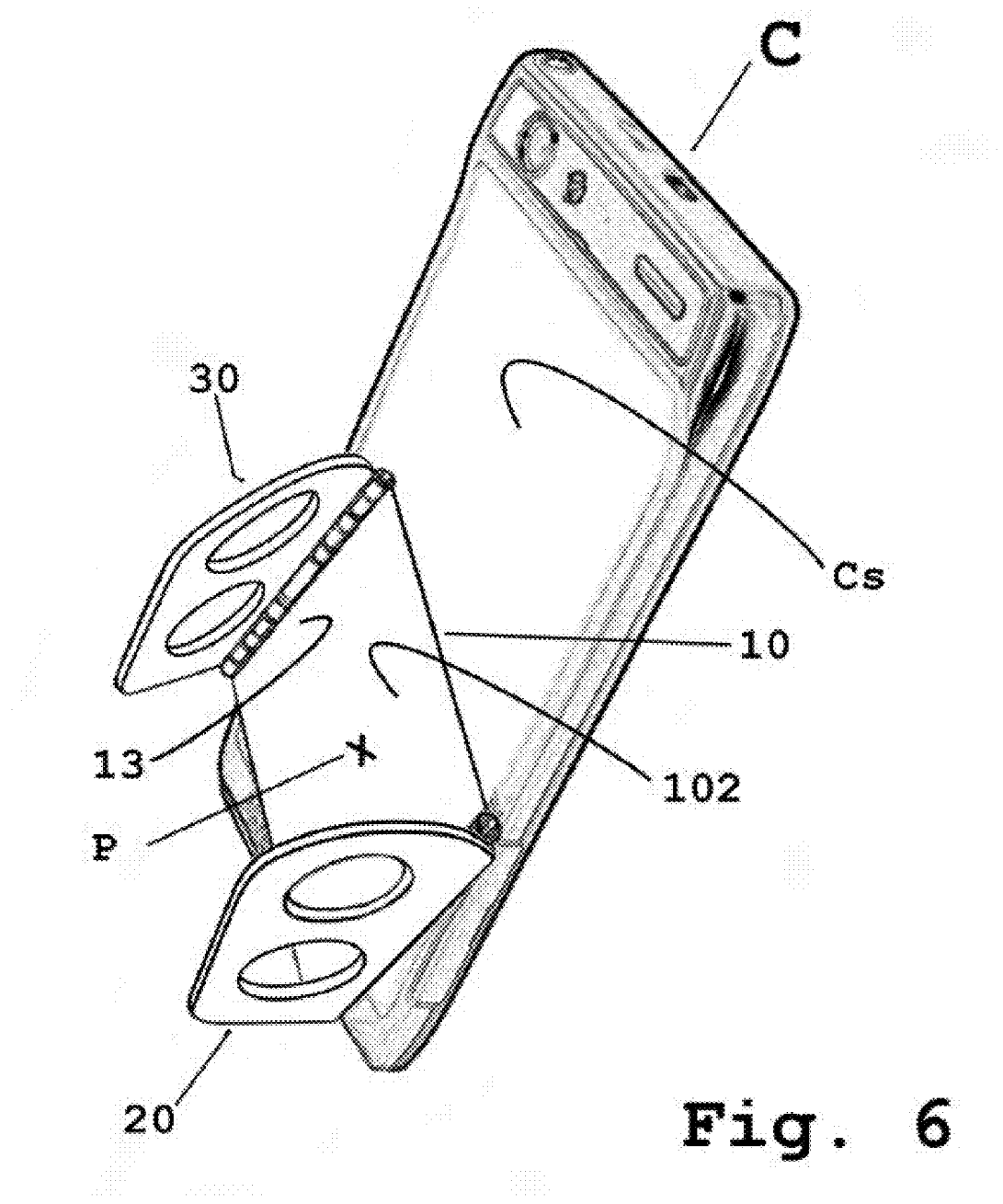
FIG. 6 shows a lateral-rear view of an example of the holding device attached to the back of the mobile device cover my means of a pivot axis. The pivot axis attachment mechanism allows the whole holding device structure to rotate or swivel in clockwise and counter-clockwise direction. This configuration is intended to provide additional degrees of freedom for the user hand and fingers and may improve usability in particular when attached to larger portable devices.

FIG. 6 is a perspective view showing another embodiment of the holding aid for a mobile electronic device. The holding apparatus is shown in active configuration and attached to the back of a device cover C. In this embodiment the attachment of the base device member 10 to the back surface CS of the device cover is implemented by rotatable cylindrical pivot member which center is defined by the connection point P. The cylindrical pivot member is constructed to point outwardly and with a direction perpendicular to the back surface CS of the device cover C and generally installed at the middle of the base member 10. The pivot P cylindrical body is also installed generally in the middle of the back surface CS in relation to the width of the device cover. The base member 10 may be attached and secured to the cylindrical pivot by several mechanisms, but generally may contain a hole in which the cylindrical pivot barrel is inserted and held in place by a pin head, screw or bolt. The pivot attachment at the connection point P should allow the whole holding aid structure composed of the base member 10 together with the assembly of the lateral flat members 20 and 30 to swivel or rotate in clockwise and counter clockwise direction around the pivot point P.

The rotation of the whole holding aid fixture assembly comprehended by the base 10 and both lateral members 20 and 30 can vary from 0° to 30° or even up to 45° in relation to the position where the lateral members 20 and 30 are generally parallel to the side and lateral surfaces of the device cover. The rotation should stop approximately around an angle of 45° or less in relation to the vertical direction of the device cover by implementation of a friction or lock mechanism that will prevent the holding fixture further rotation.

The rotation of the holding aid assembly described in FIG. 6 is an optional embodiment of the holding apparatus H, and may increase the ability of the user fingers to extend and operate keys or buttons on a mobile device, as for instance those keys that are far way, in particular for larger devices.

Figure 7:
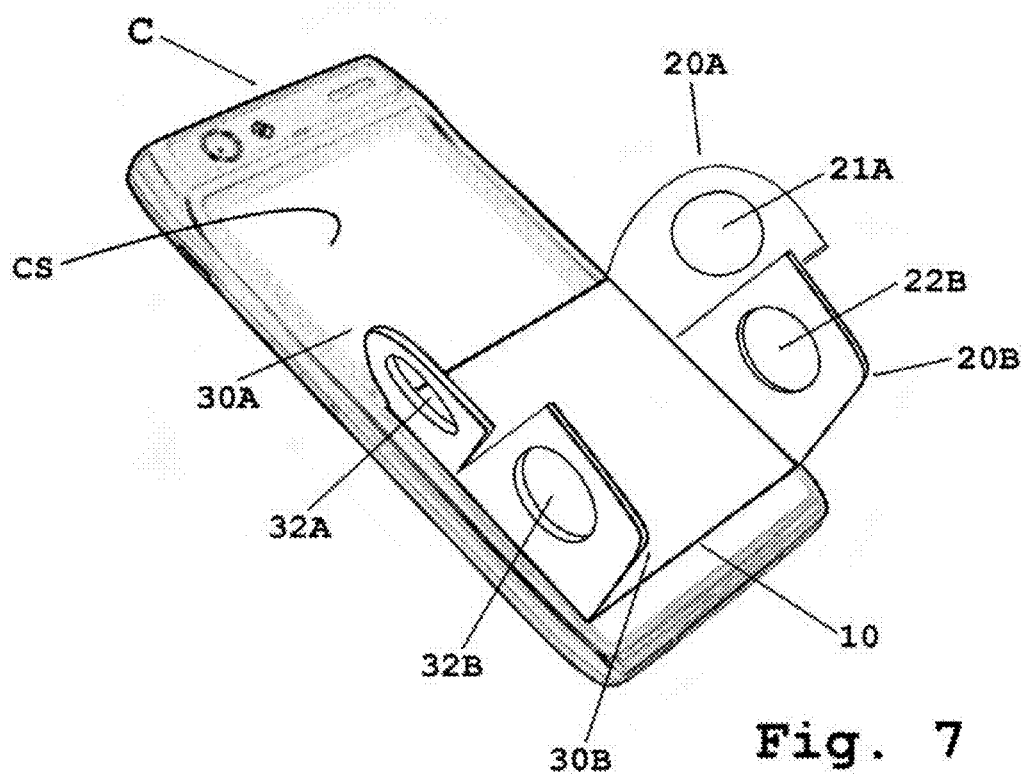
FIG. 7 shows a rear-lateral view of an example of the holding device attached to the back of the mobile device. In this embodiment the lateral holding tabs are constructed in such way that they are separated in four independent tabs each one connected to the base member with a flexible material articulation mechanism. This configuration is intended to provide additional degrees of freedom for the user hand and fingers and may improve usability when attached to larger portable devices.

FIG. 7 is a perspective view showing another embodiment of the holding apparatus for a mobile electronic device. The holding aid is shown in active configuration and attached to the back surface CS of a device cover C. In this embodiment each one of the flat tab members is subdivided in two independent sections that can rotate around the joint articulation independently. The member 20 is split into the flat tab member 20A and 20B which are independently attached to base member 10 via a flexible material articulation or a hinge mechanism. In a symmetric way the member 30 is split into the flat members 30A and 30B.

In the embodiment described by FIG. 7, each one of the flat tab members is equipped with orifices to accommodate user finger tips. The intent of this holding device design is to provide to the user fingers and hands additional freedom of movement. Each one of the lateral flat tabs 20A, 20B, 30A and 30B of the holding aid H should swivel or rotate inwardly and outwardly of the surface CS on the back of the device cover. When the device is open in an active configuration the surfaces of the flat tab members 20A, 20B, 30A and 30B should open up to an angle of preferably from 45° to 90° to 135° or more in relation to the plane defined by back surface CS. When each one of the lateral tabs start to reach a predefined opening angle limit an articulation implemented stop mechanism or a hinge friction mechanism should impart additional rotation resistant and maintain the tabs around the appropriate angle for user utilization. By increased friction or locking mechanism the lateral tabs are maintained more firmly in position to facilitate user finger tips insertion in the appropriate tab orifices and therefore hold the mobile device.

Figure 8:
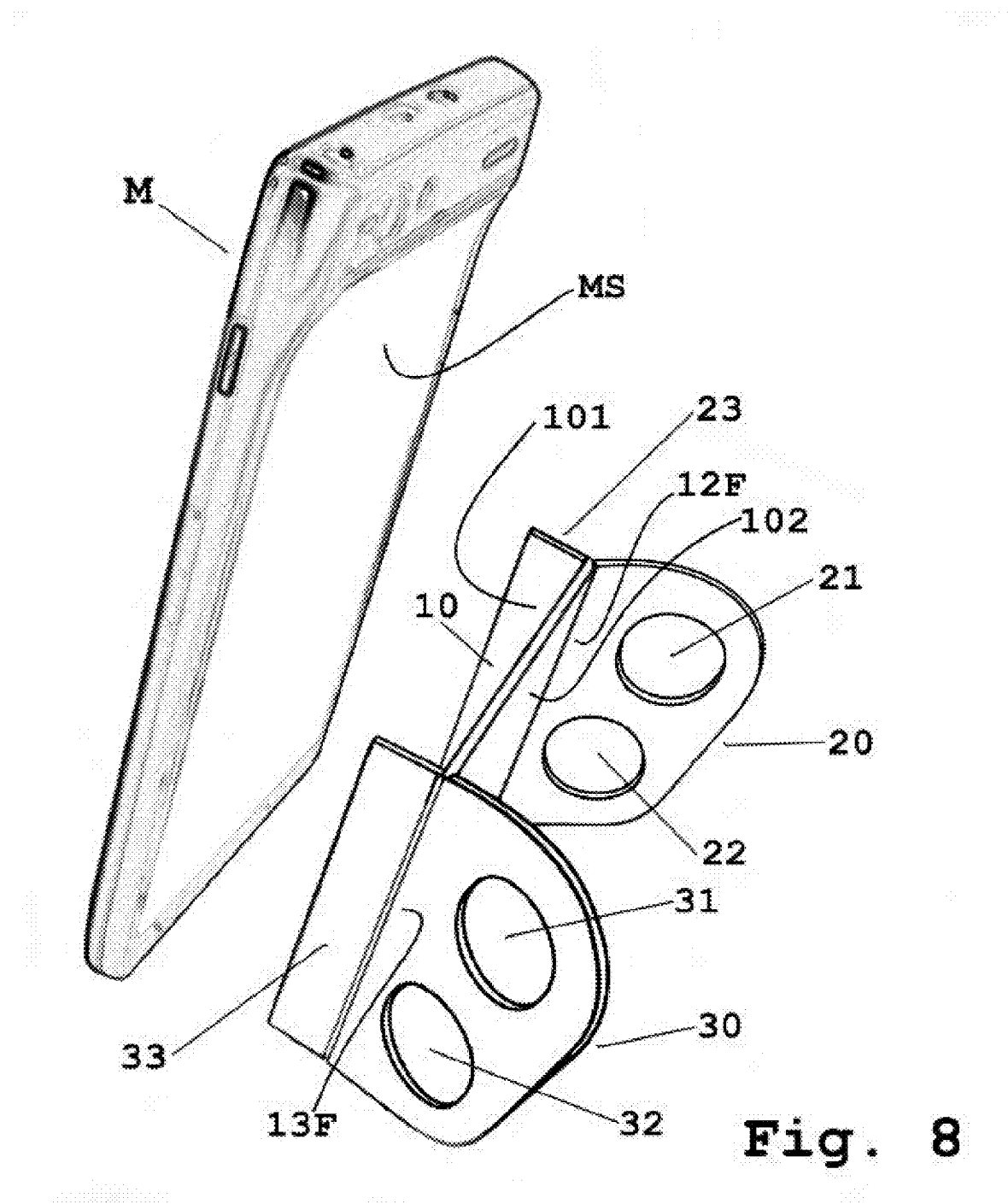
FIG. 8 shows a rear-lateral view of an example of the holding apparatus constructed with a snap in mechanism and a hook designed to attach to the rear of a mobile device by embracing the body of the mobile device. This construction design may be used to snap the holding device apparatus directly to the body of a mobile device with a combination of pressure, hook or grove mechanism.

FIG. 8 is a perspective view showing an example of the holding aid H for a mobile electronic device designed to attach directly to the body of the mobile electronic device M by a grip, brace or pressure and lock mechanisms. In this embodiment the holding device H is constructed with two additional tabs and hooks to attach to the mobile device body from the rear of the mobile device. The rear of the mobile device body is defined by the two lateral surfaces and the surface MS at the back of the device. The holding aid attachment mechanism to the body of the mobile device is designed to embrace around the back surface MS and both sides of the mobile device body and fixed in place by implementing hooks, locks or grip mechanisms to the lateral surface of the mobile device body. In order to attach to the mobile device lateral surfaces the holding aid H should be preferably fitted with two additional side tabs 23 and 33. The side tab 23 is installed preferably at the border of the base member 10 in such a way that the tab is also parallel to the side of the mobile device body. The side tab 23 is perpendicular to the back surface 101 of the base member 10 and the width of member 10 should approximately be the same as the width of the mobile device body.

Similarly, on the other side of the base member 10 the side tab 33 is installed at the edge of the base member 10 and perpendicular to the surface 101, and in parallel alignment with the side and lateral surface of the mobile device.

The width of the side tabs 23 and 33 should have preferably and approximately the same dimension as the thickness of the mobile device body to allow the side tabs 23 and 33 to fully embrace the mobile device side.

The width of base member 10 should have the appropriate dimension when compared with the width of the body of the mobile device, in order that the body of the mobile device will be embraced and fit in between the side tabs 23 and 33 with no clearance or looseness. Additionally the edge of the side tabs 23 and 33 that are to become close to the edge of the mobile device front surface, when the mobile device is inserted between the side tabs 23 and 33, should be fitted with an attachment grip, hook, groove and ridge, or pin mechanisms. That grip, hook or ridge and groove, or pin mechanisms should excerpt pressure or friction on the lateral surface of the mobile device and by this mechanism to firmly attach the holding apparatus H to the outer body surface of the mobile device.

This snap in mechanism may take advantage of existent grooves or salient parts at the external lateral surfaces of the mobile device for fixation or eventually the attachment can be achieved only by embracing the mobile device body with a combination of pressure and grips along the edge and inner surfaces of the lateral grip tabs 23 and 33. The attachment or grip of the holding aid apparatus to the case or cover of the mobile device may also be achieved by other means and may use a variety of other attachment techniques, as for instance attachment based on utilization of screws, bolts, tape, adhesive, Velcro, glue, pressure pins, etc. The lateral grip tabs 23 and 33 may also implement appropriate form and openings according to the mobile device model to allow for the presence of mobile device buttons, keys or other connection jacks.

Figure 9:
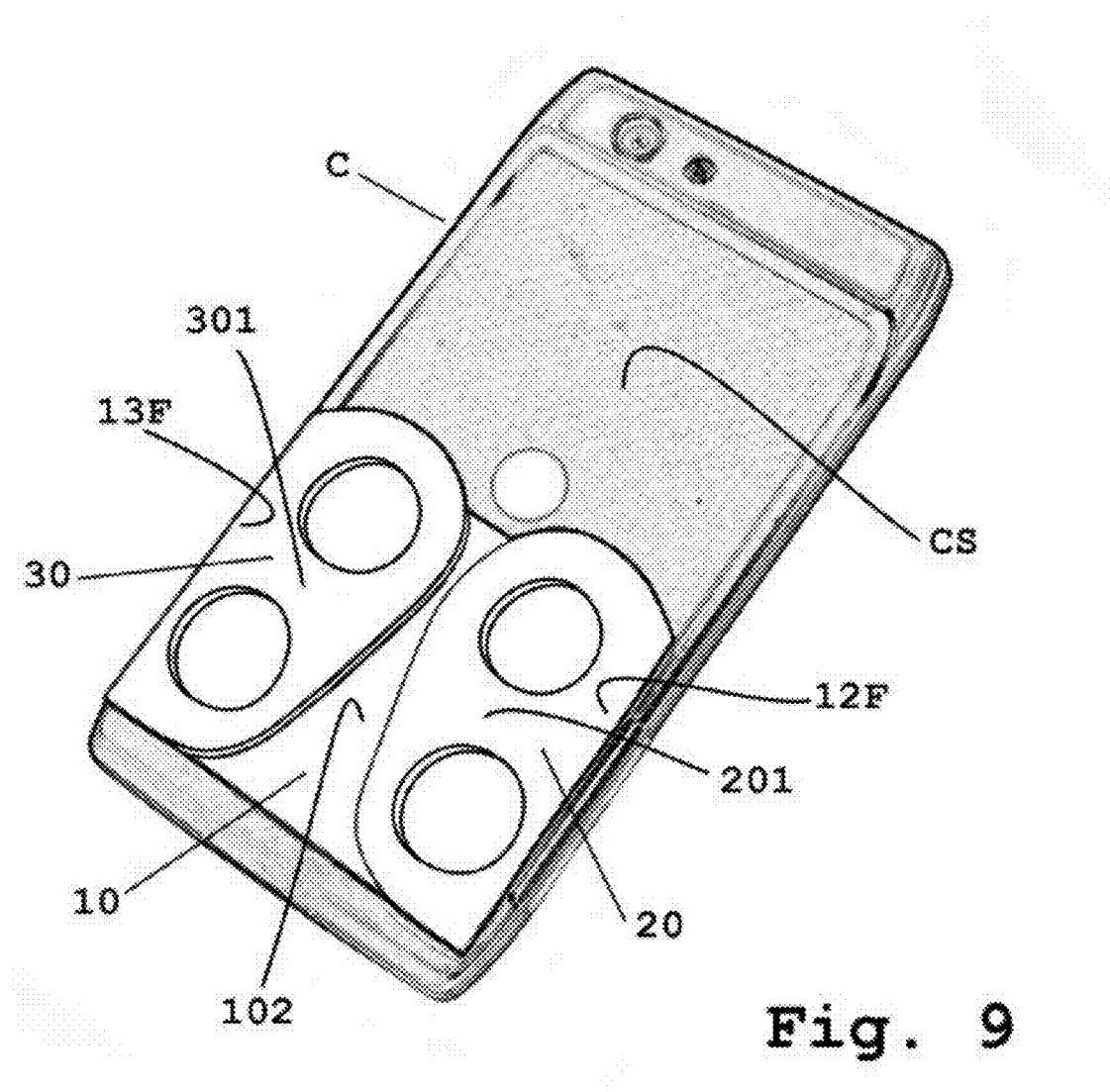
FIG. 9 shows a rear view of an example of the holding device in a passive position, attached to the back of a mobile device with the lateral tabs rotated towards the back surface of the mobile device and in a closed position. This rotation of the tab members allow for easy transportation in user clothing pockets or in a pouch wallet case cover.

FIG. 9 is a perspective view showing an embodiment of the holding aid for a mobile device constructed in accordance with the present disclosure. The holding aid H is shown with its base or platform member integrated on the back surface of the mobile device in a passive or closed configuration. The closed or passive configuration means that both lateral flat members are folded back towards the back surface of the mobile device.

In FIG. 9, the base member 10 is seamlessly incorporated on the back surface CS of a mobile device cover or case. The rotatable flat tab members 20 and 30 are attached via an articulation mechanism to the back surface CS at the edge of the back surface CS with the side of the mobile device. The articulation mechanism allows the flat tab members to swivel or rotate towards the surface 102 of the member 10 which is parallel and integrated into the back surface CS. When both lateral flat tab members completely rotate towards the surface CS or surface 102 of the member 10 of the holding aid, the surfaces 301 and 302 of the member 30, as well as the surfaces 201 and 202 of the member 20 become parallel and rest over the surface CS or surface 102 of the member 10. This configuration of the holding device is said to be closed or passive configuration. Once the internal surface of the members 20 and 30 are respectively parallel to the surface CS or surface 102 of the member 10 the flat tabs 20 and 30 may be fixed in position by a grip, hook, lock or pressure pin mechanism or a friction mechanism implemented at the articulation. The locking mechanism may also be preferably implemented by a pin and pressure, matching groove and ridge pairs consisting of grooves and matching dents, ridges, corrugations, roughened surfaces or combinations thereof that increase friction and maintain the flat tabs 20 and 30 in closed or passive position.

In order to reduce the holding device profile volume while in closed position the flat tab members 20 and 30 may preferably be constructed with a low profile or accommodated on a recess with a depth matching the thickness of the lateral flat tab members. The thickness of the flat tab members 20 and 30 generally may not exceed approximately 2 mm or up to 3 mm or 5 mm. However larger thickness may be appropriate for larger and heavier mobile devices.

Also and preferably the device cover back surface CS may be constructed with a recess of the same form and depth of the flat tab members 20 and 30 form and thickness to completely accommodate the flat members 20 and 30 in the recess as these members rotate towards the surface CS and become parallel to CS and therefore parking in the recess.

OPERATION AND ADVANTAGES

In this section it is described the operation of the holding aid emphasizing the anatomical and ergonomic aspects involved when a user holds a mobile device to enter data by typing on a touch sensitive screen keyboard.

Figure 10:
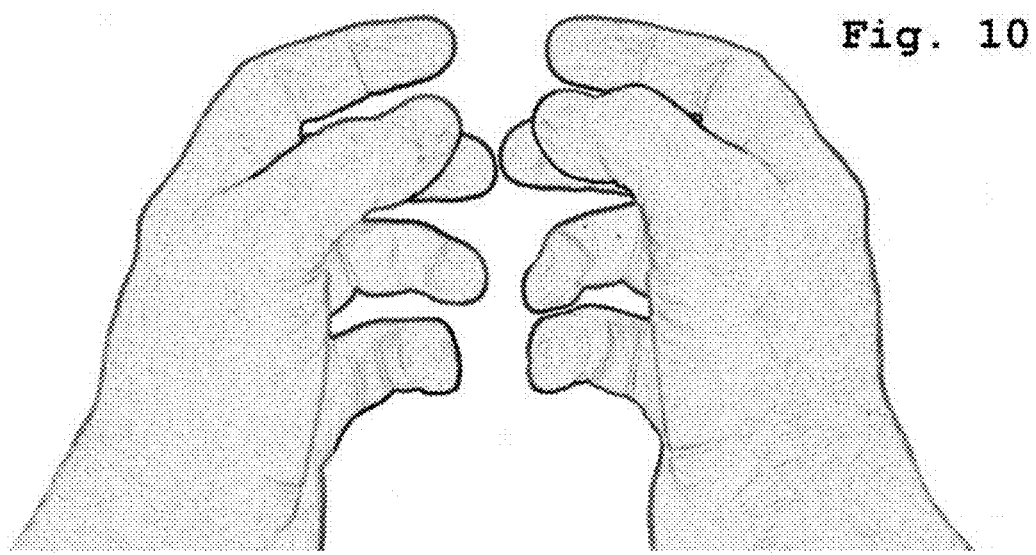
FIG. 10 shows a front view of user hands and fingers position while holding a mobile device and at the same time typing on the touch screen keyboard. In this figure and to display the position of the fingers the mobile device was removed. The figure shows that user thumbs should be free to hover above the touch sensitive screen keyboard while the other fingers hold the device in place.

FIG. 10 illustrates of the position of user hands and fingers while typing on mobile electronic device. The figure is intended to appreciate the position of the user hands and fingers and the anatomical and ergonomic details that inspired this invention. As shown in the figure the user index and middle fingers are set normally behind the device and lean on the back surface of the mobile device case. On the other hand the user thumbs are usually over the front surface of the device to operate the keys on the keyboard. For devices implementing a physical keyboard the thumbs can rest on the physical keyboard without activating any keys and at the same time the device can be held secure by a light pressure applied between the thumbs and the index and middle fingers. This way of holding the mobile device is not possible anymore if the device is equipped with a touch sensitive screen.

Figure 11:
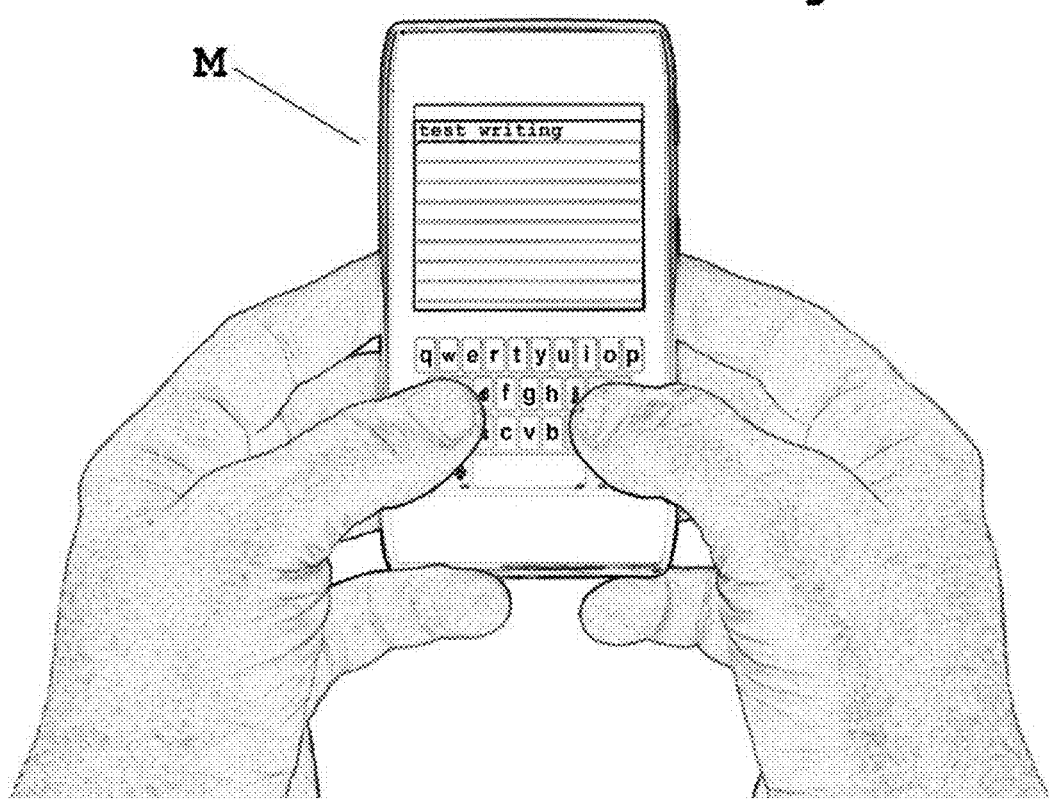
FIG. 11 shows a front view of an example of the holding device attached to the back of a mobile device (and therefore not shown in the picture). Particularly, this figure displays the operation details of the user thumbs over the keyboard while the other user fingers are accommodated in the corresponding orifices at the back of the device.

FIG. 11 shows the position of user hands and fingers when the user is typing on a mobile device equipped with an embodiment of holding aid apparatus. The figure shows the user hands in the same position as shown in FIG. 10. The index, middle and ring fingers are generally behind the device and resting over the back surface of the mobile device. The user thumbs are free to hover over the touch screen keyboard and are used to press the desired keys. In this figure the holding device H is not shown because it is installed behind the mobile device M, and the user middle and ring finger tips are accommodated in the corresponding holding aid flat tab orifices.

Figure 12:
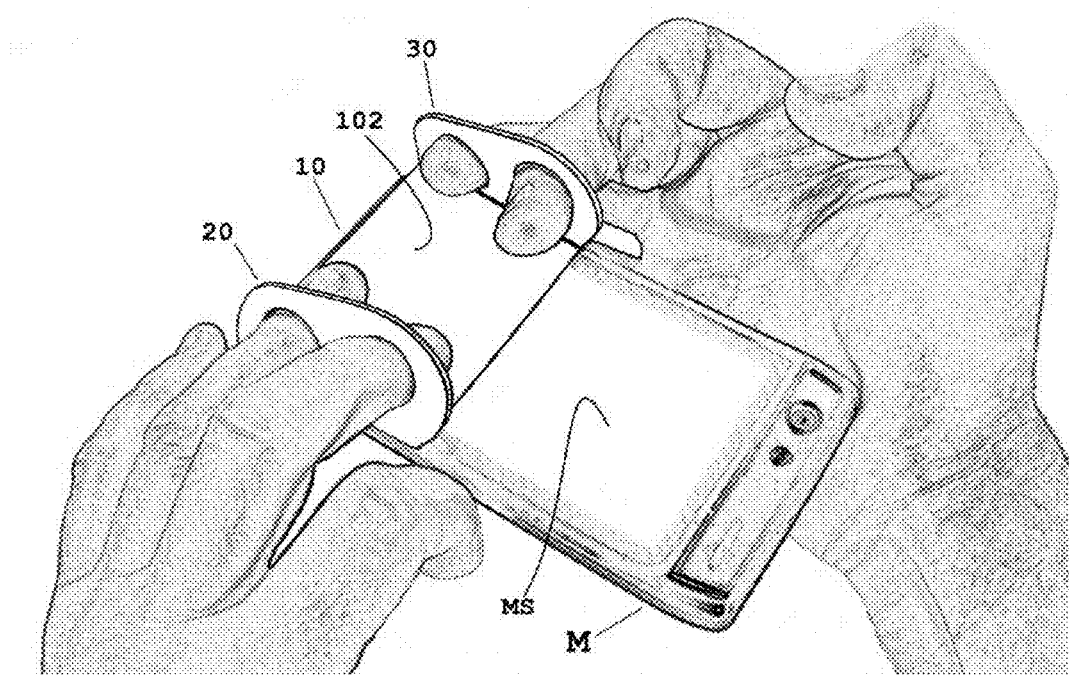
FIG. 12 shows a rear view of an example of the holding aid device attached to the back of a mobile device. This figure displays the position of the user finger tips at the back of the device while they are inserted into the corresponding orifices on each one of the flat lateral tab members.

FIG. 12 shows a rear perspective view of an example of the holding aid constructed in accordance with this disclosure. FIG. 12 also shows the member 10 of the holding aid attached to the back surface MS of the mobile device M. The attachment of the back surface of the base or platform member 10 to the mobile electronic device can be implemented using adhesive, adhesive tape, screws, Velcro or any other appropriate attachment means. Additionally, FIG. 12 also shows that the holding member 20 is used to accommodate the tips of two fingers of the left hand of the user and the holding member 30 accommodates the tips of two fingers of the user's right hand. The user middle and ring fingers of each hand are inserted in the appropriate orifices to hold the device, and other user fingers of both hands are free to operate the touch screen keyboard or other mobile device keys.

Figure 13:
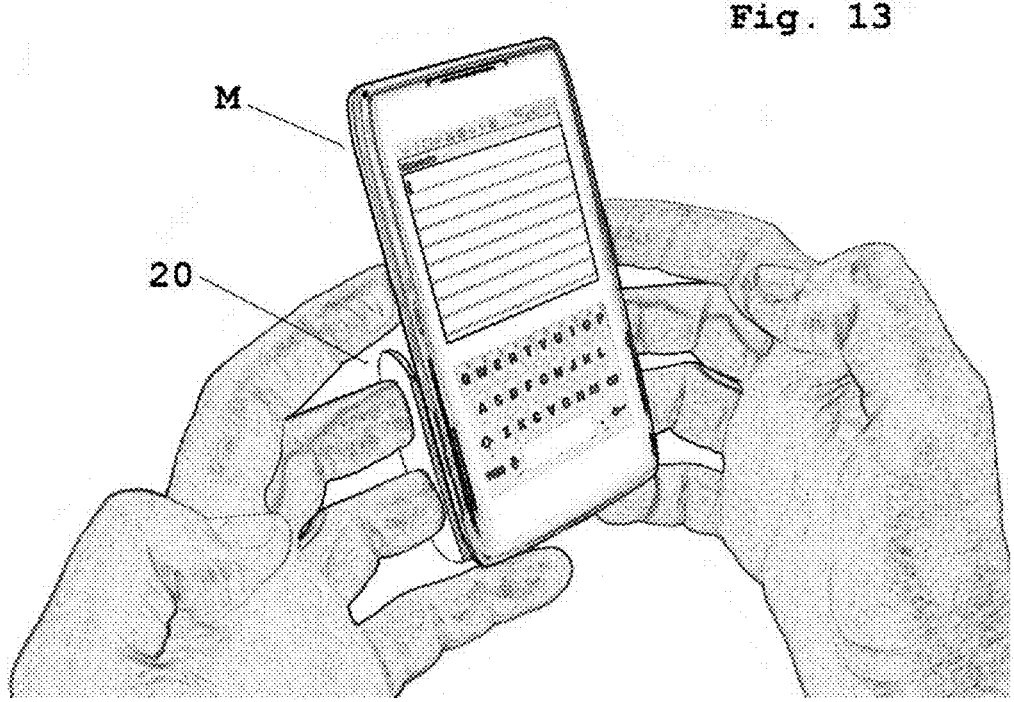
FIG. 13 shows a lateral rear view of an example of the holding device attached to the back of a mobile device. This figure displays the position of the user fingers while they are inserted into the corresponding orifices on the flat lateral tab members.

FIG. 13 is lateral view of the same configuration shown in FIG. 12 but from a different viewing angle, and demonstrates an embodiment of the holding aid for a mobile device M as viewed from the lateral perspective. In this embodiment the holding aid base member 10 is attached to the external back surface or case of a mobile device M. As can be appreciated in FIG. 13, the lateral view show details of the user left hand, middle and ring fingers inserted in the designated orifices of the member 20. The right hand fingers are inserted in the designated orifices of the member 30 but cannot be directly seen because they are hidden behind the device M. The figure also shows that the other fingers of both hands are free to move and operate the touch screen keyboard or other keys of the mobile device.

The orifices on the lateral flat tab members not only allow the user to insert the finger tips' but also allow the finger tips to slide and rotate while the user hand and other free fingers reach out to other mobile device function keys.

Additionally the joint articulated mechanism between the lateral flat tab members and the base member allow for the flat tabs to rotate around articulation axis, as for instance the articulations 12/12F and 13/13F as displayed in detail on figures FIG. 1, FIG. 2 and FIG. 3.

What is claimed is:

1. A holding aid apparatus allowing a user to securely hold a portable or mobile device having a mobile device body while the user operates or type on the mobile device touch sensitive screen keyboard comprising: a base platform member with two surfaces, one surface constructed with a mechanism to attach to a back surface of a mobile device external body shell, case or cover, other surface complementary in relation to the back surface of the mobile device, the base platform member that is embedded or seamlessly integrated into the back surface of the mobile device case or cover, and the base platform member constructed with two side tabs or grips, one tab on each side, to embrace the mobile device external body shell around the back surface by means of the two side tabs, hold on to the mobile device external body shell by a pressure mechanism composed of pins, ridge, and groove or corrugations or combinations thereof along the side of the mobile device external body shell, the base platform member constructed to be attached to the back surface of the mobile device external body shell with employment of a pivot pin or pivot screw allowing a holding aid fixture to rotate around an axis perpendicular to a plane defined by the back surface of the mobile device, the base platform member constructed with a depression or recess with a form factor that matches each lateral flat tab members and with a depth corresponding to the thickness of each lateral flat tab members in order that the lateral flat tab members can park inside the recess when the lateral flat tab members are in a closed configuration, the flat lateral tab members attached to the base platform member by means of a joint mechanism along two sides of the base platform member, which are parallel and aligned with the mobile device lateral sides, flexible joint articulations located at edge of the back surface of the mobile device with its lateral surface or with some indentation from the lateral edge of the mobile device, the lateral flat tab members are connected to the base platform member by means of a flexible material articulation mechanism or by a hinge articulation mechanism.

2. The apparatus of claim 1, wherein the base platform member constructed with a surface that is complementary to the back surface of the mobile device or mobile device cover in order to adjust and match to the mobile device back surface form, further, constructed with mechanism to attach to the back of the mobile device case or cover by employment of screws, bolts, pins, adhesive, adhesive band, Velcro, or combinations thereof.

3. The apparatus of claim 1, wherein the base platform member with mechanism to attach to the back surface of the mobile device case or cover and two or four lateral flat tab members comprising: each lateral flat tab members connected to the base platform member by means of flexible articulation mechanism which is near to the lateral edge of the base member and also aligned parallel to the side of the mobile device case or cover, the flexible articulation mechanism which allows the flat tab members to perform a rotation movement around the articulation with the base member, lateral flat tab members constructed with different sizes and forms but compatible with mobile device size, the holding aid embodiment with two lateral flat tab members, each flat tab having two orifices for users to insert to the appropriate length the tips of index fingers and middle fingers of each hand, or the tips of the middle and ring fingers of each hand, the holding aid embodiment with four lateral flat tab members, each flat tab having one orifice for a user to insert to the appropriate length the tips of each one of the index or middle fingers, or middle and ring fingers of each hand, lateral flat tab members fabricated with a rigid or semi-rigid material as for instance rubber, plastic and or polymer resin, or composite material of polymer resin and fabric, or metal, lateral flat tab members constructed with a thickness preferably from 1 mm to 5 mm, or even more but that is not too thin to cause discomfort to the user finger when inserted in the flat tab orifices while considering the size and weight of the mobile device, and also a thickness that preferably do not considerably increase the profile of the holding aid while in closed configuration, the flat tab containing orifices in the form of circle, elliptical or even as a rectangle of round corners and fabricated in different sizes to match the mobile device size and average user's finger size, lateral flat tab orifices with smooth internal surfaces and without sharp edges allowing fingertip rotation movement or sliding according to the movements of the hand and fingers while the user reach out to keys or the touch sensitive screen, lateral flat tab orifices adjustable in size by means of attachable rings of different sizes that can be installed or removed, if the ring is installed it decreases the diameter of the orifice and if the ring is removed the diameter of the orifice returns to original size, flat tab member orifices constructed larger, elongated, with a form similar to an ellipsis or rectangle of round corners and adjustable in size to allow the user to insert more than one finger of each hand through the orifices, as for instance index in the first orifice and middle and ring fingers through the other elongated orifice.

4. The apparatus of claim 1, wherein the base platform member connected to the base member by an articulation mechanism, the articulation mechanism which stationary parts are connected to the portable device case or cover and the articulation rotatable parts (barrel or pivot) are connected and secure the lateral flat tab members, the articulated joint between the lateral flat tab members and the base platform member allowing the flat tab members to swing or rotate (inwards or outward) around the articulation axis, the articulation mechanism by means of which each one of the connected lateral flat tab members can rotate independently around the articulation axis, the articulation mechanism allowing the flat tab members to rotate towards the back of the device or the surface of the base member which is parallel to the back surface of the mobile device until the flat tab member is completely folded to the back of the device in a compact and closed configuration, the articulation mechanism with a friction mechanism which as the lateral flat tab members rotates may also increase resistance against further rotation after certain opening angle between the lateral flat tab members and the plane defined by the back surface of the device, the articulation mechanism constructed to deliver several levels of increased resistance to further rotation when the holding aid lateral flat tabs are rotating towards the exterior of the apparatus, the articulation mechanism rotation movement that may be locked or restrained at a certain opening angle of the lateral flat tab members with the base member by a lock or friction mechanism, the articulation mechanism that implements a stop, lock or restrain by increased friction or lock when the flat tab member is folded back to a closed position and to secure the lateral flat tabs closed, the articulation mechanism implemented by a flexible material articulation joint or the articulation mechanism implemented by a hinge mechanism.

5. The apparatus of claim 1, wherein the base platform member and lateral flat tab members structure are attached to the mobile device by means of a pivot mechanism comprising: a cylindrical pivot member whose axis extends perpendicular from the back surface of the mobile device and around which a holding aid structure is inserted by means of a hole and fixed in place by a screw, bolt or pin, or pressure mechanism, the pivot mechanism allowing whole of the holding aid structure to rotate clockwise and counter-clockwise in relation to the direction of the sides of the mobile device and around the cylindrical pivot axis, a friction mechanism that increases the friction and resistance to additional rotation after the base member increases the rotation in relation to the vertical direction of the mobile device by an angle greater than a certain pre-set value that could be around 10 degrees or up to 45 degrees or even larger angle, a stop, lock or friction mechanism implemented with stops, grooves, dents, ridges, corrugations or roughened surfaces or combinations thereof to stop the base member rotation movement at a predefined rotation angle or when the base member is returned to a position aligned parallel and along length of the mobile device.

6. The apparatus of claim 1, wherein one part of an articulation mechanism is directly attached to the back surface of the mobile device case or cover and the lateral flat tabs are attached to other rotating part of the articulation mechanism comprising: a hinge mechanism where the stationary part of the hinge is directly attached or embedded to the back surface of the mobile device body shell, cover or case, parallel and close to each one of the sides of the mobile device body, the hinge mechanism where the lateral flat tab members are attached to the other rotating part of the hinge that could be either the rotating barrel or rotating pivot, the hinge mechanism located close or at the edge defined by the back surface of the device and device side surfaces or located with some indentation distance in relation to the lateral edge of the mobile device body, the articulation mechanism composed of a flexible material joint and one side attached to the back surface of the mobile device and the lateral flat tabs attached to the other flexible and moving part of the flexible material joint.

7. The apparatus of claim 1, wherein a holding aid structure is secured to the mobile device body by means of side tabs or grips that embrace the mobile device body from the back and the side tabs or grips holding to the sides of the mobile device comprising: two side tabs perpendicular to the base member and positioned along each one of the sides of the base member on the opposite side of the lateral flat tab members and facing the back surface of the mobile device, the two side grip tabs separated by approximately the same distance as the width of the mobile device, aligned and positioned along the edge of the base member and each one parallel and aligned with each one of the sides of the mobile device, the two lateral grip tab members with a width comparable to the mobile device thickness and so that the outer edge of the lateral grip tab align with the touch screen surface when the lateral grip tabs are inserted in place around the mobile device body, embracing the mobile device, the lateral grip tabs on each side of the base member embracing the mobile device body from the back and securing in place the holding aid structure by means of pressure, friction, grooves and ridges or combinations thereof at the lateral surface of the mobile device.

* * * * *